(12) United States Patent
Shao et al.

(10) Patent No.: US 11,801,733 B2
(45) Date of Patent: Oct. 31, 2023

(54) LIQUID COOLING LOOP DESIGN FOR HIGH PERFORMANCE PROCESSORS IN HARSH VEHICLE ENVIRONMENT

(71) Applicant: Baidu USA LLC, Sunnyvale, CA (US)

(72) Inventors: Shuai Shao, Sunnyvale, CA (US); Tianyi Gao, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 605 days.

(21) Appl. No.: 16/582,745

(22) Filed: Sep. 25, 2019

(65) Prior Publication Data

US 2021/0086589 A1    Mar. 25, 2021

(51) Int. Cl.
*B60H 1/32* (2006.01)
*B60W 40/02* (2006.01)
*G05D 1/02* (2020.01)
*G06F 1/20* (2006.01)
*B60H 1/00* (2006.01)

(52) U.S. Cl.
CPC ......... *B60H 1/32281* (2019.05); *B60H 1/323* (2013.01); *B60W 40/02* (2013.01); *G05D 1/021* (2013.01); *B60H 1/00271* (2013.01); *G06F 1/20* (2013.01)

(58) Field of Classification Search
CPC .... B60H 1/32281; B60H 1/323; G05D 1/021; B60W 40/02
See application file for complete search history.

(56) References Cited

U.S. PATENT DOCUMENTS

| 9,631,547 | B2* | 4/2017 | Porras | B60H 1/034 |
| 2010/0025006 | A1* | 2/2010 | Zhou | B60L 58/26 |
| | | | | 165/59 |
| 2015/0115048 | A1* | 4/2015 | Brodie | B60H 1/00807 |
| | | | | 237/12.3 B |
| 2016/0200165 | A1 | 7/2016 | France et al. | |
| 2019/0168569 | A1* | 6/2019 | Lee | B60H 1/22 |

(Continued)

FOREIGN PATENT DOCUMENTS

| CN | 101091424 A | 12/2007 |
| CN | 107042743 A | 8/2017 |
| CN | 107804157 A | 3/2018 |

(Continued)

*Primary Examiner* — David J Teitelbaum
(74) *Attorney, Agent, or Firm* — WOMBLE BOND DICKINSON (US) LLP

(57) ABSTRACT

In one embodiment, an autonomous driving system to autonomously drive an autonomous driving vehicle (ADV) includes one or more processors, a perception module executed by the processors to perceive a driving environment surrounding the ADV, and a planning module executed by the processors to plan a path based on perception data of the driving environment to navigate through the driving environment. The processors are mounted on one or more cold plates coupled to a vehicle cooling system of the ADV, the vehicle cooling system having a first radiator and a first coolant distribution loop coupled to a vehicle engine of the ADV to provide liquid cooling to the vehicle engine. The cold plates are coupled to the first radiator via a second coolant distribution loop to receive a portion of the coolant from the first radiator to extract heat from the cold plates.

19 Claims, 7 Drawing Sheets

(56) References Cited

U.S. PATENT DOCUMENTS

2020/0317019 A1\* 10/2020 Gutowski ............ H01M 10/663
2021/0221199 A1\* 7/2021 Lee .................... B60H 1/00271

FOREIGN PATENT DOCUMENTS

| CN | 108508880 A | 9/2018 |
| CN | 208172720 U | 11/2018 |
| CN | 109196966 A | 1/2019 |
| CN | 109318700 A | 2/2019 |

\* cited by examiner

400

Receive a portion of coolant from a radiator of a vehicle via a coolant supply line from an outlet port of the radiator of the vehicle
401

Distribute the received coolant to one or more cold plates to be mounted onto one or more processors of a computer system running within the vehicle
402

Return the coolant carrying heat exchanged from the cold plates back to an inlet port of the radiator via a coolant return line
403

FIG. 4

LIQUID COOLING LOOP DESIGN FOR HIGH PERFORMANCE PROCESSORS IN HARSH VEHICLE ENVIRONMENT

TECHNICAL FIELD

Embodiments of the present disclosure relate generally to operating autonomous driving vehicles. More particularly, embodiments of the disclosure relate to providing liquid cooling for a computer of autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors allowing the vehicle to travel with minimal human interaction or in some cases without any passengers.

In autonomous driving applications, nowadays more sensors are installed on the top and sides of the vehicle, capturing real-time signals and images. The demand for real-time computing performance continues to grow. Meanwhile, compact space and hash working environment in the vehicle bring many technical challenges in thermal management for those high performance computing processors (e.g., GPU).

Air cooling is a typical solution to manage the heat dissipation of processors on vehicle. Their shortfalls are: 1) low thermal performance, which may not be sufficient for high-power processors; and 2) fan noise when the computing equipment is installed in the passenger compartment.

BRIEF DESCRIPTION OF THE DRAWINGS

Embodiments of the disclosure are illustrated by way of example and not limitation in the figures of the accompanying drawings in which like references indicate similar elements.

FIG. 4 is a flow diagram illustrating a process of providing liquid cooling to a computer system running within a vehicle according to one embodiment.

DETAILED DESCRIPTION

Figure 1:
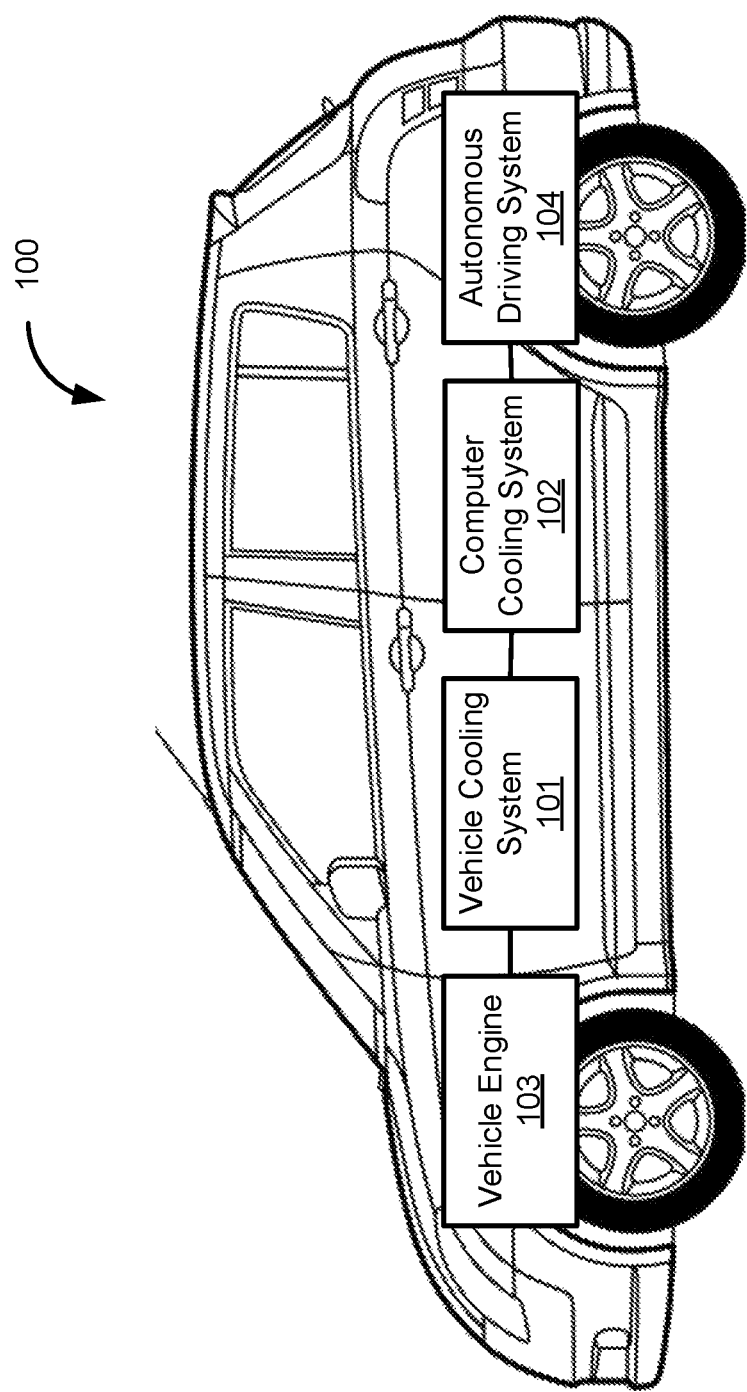
FIG. 1 is a block diagram illustrating an example of an autonomous driving vehicle according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, embodiments of the disclosure include a liquid cooling design for high performance processor used in autonomous driving vehicles. The designed cooling solution is connected to the existing liquid loop cooling the electric motor and inverter of the vehicle. They share the same fluid (e.g. antifreeze coolant), pump, radiator and fan. An additional liquid loop for heating is included in this design, to start the system in a very cold environment (e.g. −20° C.). A backup radiator and fan are also included in case the pump or fan in the main loop fails. Cold plate liquid cooling design is integrated with vehicle's motor/inverter cooling system, with heating feature for system starting in cold environment. A backup radiator and/or fan module is utilized in a branching loop for redundancy.

This liquid cooling solution is designed as a branching loop from the existing liquid circulation to cool the vehicle's electric motor and the power electronics (e.g., inverter). In the existing liquid loop, the coolant flows through the cooling devices for the inverter and the electric motor, picks up the heat and then radiates it into the air while the fan blows the air through a radiator. The liquid cooling loop for computing processors is designed using the same fluid.

According to one aspect, an autonomous driving system to autonomously drive an autonomous driving vehicle (ADV) includes one or more processors, a perception module executed by the processors to perceive a driving environment surrounding the ADV, and a planning module executed by the processors to plan a path based on perception data of the driving environment to navigate through the driving environment. The processors are mounted on one or more cold plates coupled to a vehicle cooling system of the ADV, the vehicle cooling system having a first radiator and a first coolant distribution loop coupled to a vehicle engine of the ADV to provide liquid cooling to the vehicle engine. The cold plates are coupled to the first radiator via a second coolant distribution loop to receive a portion of the coolant from the first radiator to extract heat from the cold plates.

In one embodiment, the second coolant distribution loop includes a coolant supply line coupled to an outlet port of the first radiator to receive the coolant and to distribute the coolant to the cold plates. The second coolant distribution loop further includes a coolant return line coupled to an inlet port of the first radiator to return the coolant carrying the heat exchanged from the cold plates back to the first radiator. The system further includes a first control valve coupled between the coolant supply line of the second coolant distribution loop and the outlet port of the first radiator to control an amount of coolant flowing from the first radiator to the second coolant distribution loop. The system further includes a first temperature sensor disposed on the second coolant distribution loop to sense a liquid temperature of the coolant flowing within the second coolant distribution loop. The first control valve is configured to control a liquid flow rate of the coolant in the second liquid distribution loop based on the liquid temperature sensed by the first temperature sensor.

In one embodiment, the system further includes a heater coupled to the first liquid distribution loop or the second liquid distribution loop to form a heating loop, where the heating loop is configured to receive a portion of the coolant, to warm up the coolant, and to inject the warm coolant back to the second liquid distribution loop to warm up the cold plates. The system further includes a second temperature sensor disposed a return line of the first liquid distribution loop to sense a temperature of the coolant of the first liquid distribution loop, where the heating loop is enabled when the temperature of the coolant of the first liquid distribution loop drops below a predetermined threshold. The system further includes a liquid lump disposed on the heating loop to circulate the coolant within the heating loop. The system further includes a second control valve configured to direct the coolant received from the first radiator and/or the heater to the cold plates.

In one embodiment, the second control valve is a 3-way control valve, which can at least partially couple the cold plates to an outlet port of the first radiator and/or the heater. The system further includes a second radiator coupled to the cold plates to form a backup cooling loop to provide liquid cooling to the cold plates when the first radiator is unavailable. An inlet port of the second radiator is coupled to outlet ports of the cold plates. An outlet port of the second radiator is coupled to inlet ports of the cold plates. An outlet port of the second radiator is coupled to an inlet port of the heater. The system further includes a third control valve coupled to outlet ports of the cold plates and the inlet port of the second radiator to direct the coolant from the cold plates to the heater or the second radiator. The third control valve is a 3-way valve, which can at least partially divert the coolant received from the cold plates to the heater or the second radiator. The system further includes a filter disposed between the second control valve and the cold plates to block sold particles from entering the cold plates.

According to another aspect, a cooling system for providing liquid cooling to a computer system running within a vehicle includes one or more cold plates to be mounted onto one or more processors of the computer system of the vehicle; a coolant supply line to be coupled to an outlet port of a first radiator of the vehicle to receive a portion of coolant from the first radiator and to distribute the coolant to the cold plates, wherein the first radiator provides liquid cooling to a vehicle engine of the vehicle, forming a first coolant distribution loop; and a coolant return line to be coupled to an inlet port of the first radiator to return the coolant carrying heat exchanged from the cold plates back to the first radiator, forming a second coolant distribution loop.

According to a further aspect, a method for providing liquid cooling to a computer system running within a vehicle includes receiving a portion of coolant from a first radiator of the vehicle via a coolant supply line from an outlet port of the first radiator of the vehicle, wherein the first radiator provides liquid cooling to a vehicle engine of the vehicle, forming a first coolant distribution loop; distributing the received coolant to one or more cold plates to be mounted onto one or more processors of the computer system of the vehicle; and returning the coolant carrying heat exchanged from the cold plates back to an inlet port of the first radiator via a coolant return line, forming a second coolant distribution loop.

FIG. 1 is a block diagram illustrating an example of an autonomous driving vehicle according to one embodiment. Referring to FIG. 1, ADV 100 includes a vehicle cooling system 101 and a computer cooling system 102 coupled to each other. Vehicle cooling system 101 is configured to primarily provide liquid cooling to vehicle engine 103 of ADV 100, while computer cooling system 102 is configured to primarily provide liquid cooling to autonomous driving system 104. In one embodiment, computer cooling system 102 is configured to utilize a portion of the cooling liquid or coolant provided by vehicle cooling system 101 to provide liquid cooling to one or more electronic devices (e.g., processors, memory, etc.) of autonomous driving system 104. Some of the electronic devices such as a processor of autonomous driving system 104 may be mounted on cold plates having a cooling liquid distribution channel or loop integrated therein to circulate the cooling liquid to exchange the heat generated by the electronic devices.

The coolant is shared by vehicle cooling system 101 and computer cooling system 102. Thus, when computer cooling system 102 is deployed, it can simply be connected to the coolant distribution loop of vehicle cooling system 101 to receive a portion of the coolant from the vehicle cooling system and to circulate the coolant in computer cooling system 102. Autonomous driving system 104 includes at least a perception to perceive a driving environment surrounding ADV 100 based on sensor data obtained from various sensors and a planning module to plan a path based on perception data to drive ADV 100 to navigate through the driving environment. Further detailed information concerning autonomous driving system 104 will be described further below.

Figure 2:
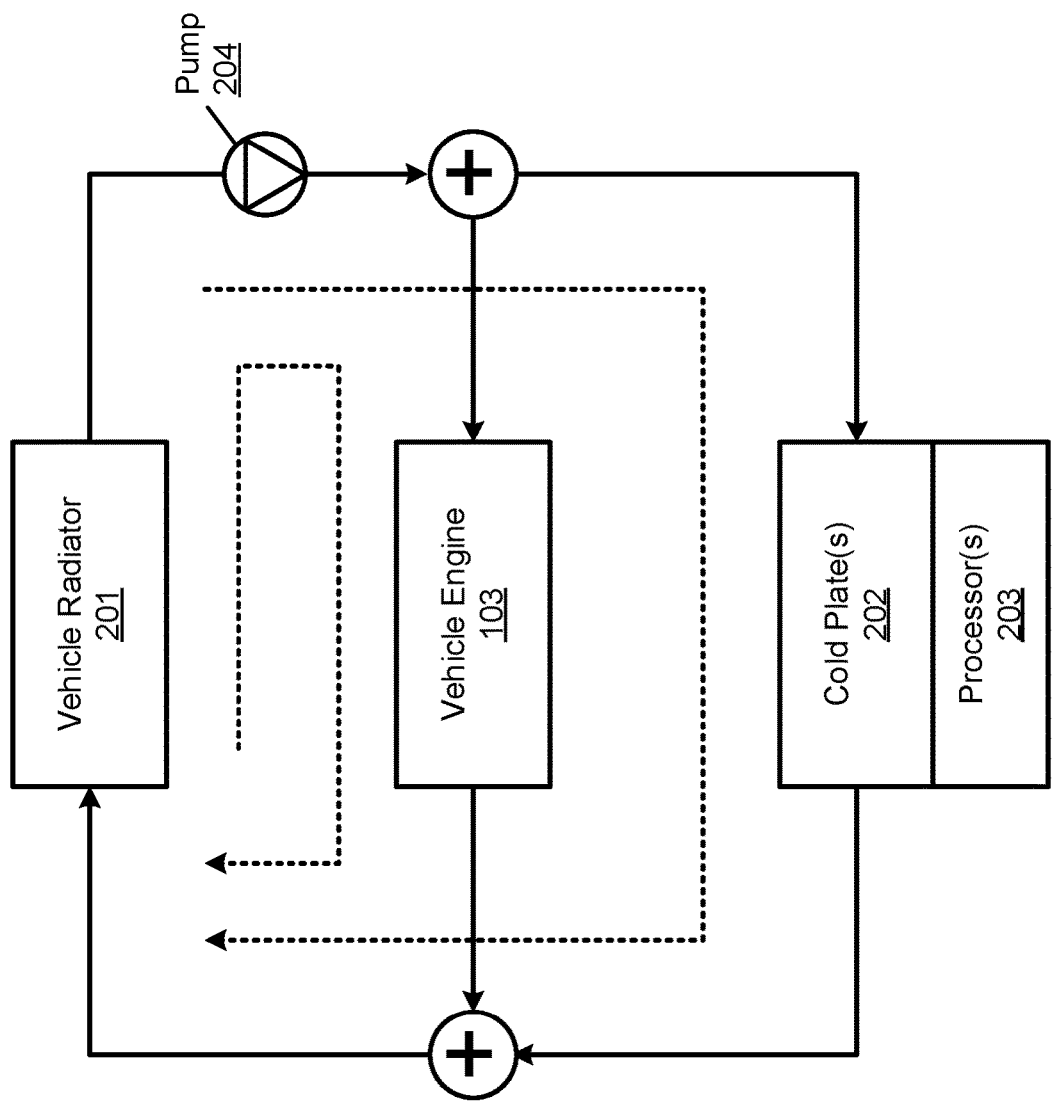
FIG. 2 is a block diagram illustrating an example of an autonomous driving vehicle according to another embodiment.

FIG. 2 is a block diagram illustrating an example of a cooling system of an autonomous driving vehicle according to one embodiment. Vehicle 200 may represent ADV 100 as shown in FIG. 1. Referring to FIG. 2, vehicle 200 includes a vehicle radiator 201, vehicle engine 103, cold plate 202 that may be attached to an electronic device of an autonomous driving system such as processor 203. Processor 203 may be a processor that executes a perception module and a planning module of an autonomous driving system to autonomously drive a vehicle.

In addition, a liquid pump 204 is configured to pump and circulate the coolant from radiator 201 to vehicle engine 103 and cold plate 202. Radiator 201 may be an air-to-liquid heat exchanger. A cooling fan (not shown) may be positioned near radiator 201 to provide air cooling to radiator 201. Vehicle radiator 201 and engine 103 may be a part of a typical vehicle, referred to herein as a first coolant distribution loop or a vehicle coolant distribution loop. The coolant is diverted from radiator 201 to cold plate 202 via a coolant supply line, flows through cold plate 202, and returned back to radiator 201 carrying the heat exchanged from processor 203 via a coolant return line, referred to herein as a second coolant distribution loop or a computer coolant distribution loop. The coolant is then air cooled again via radiator 201 by an airflow blown by a cooling fan.

Figure 3:
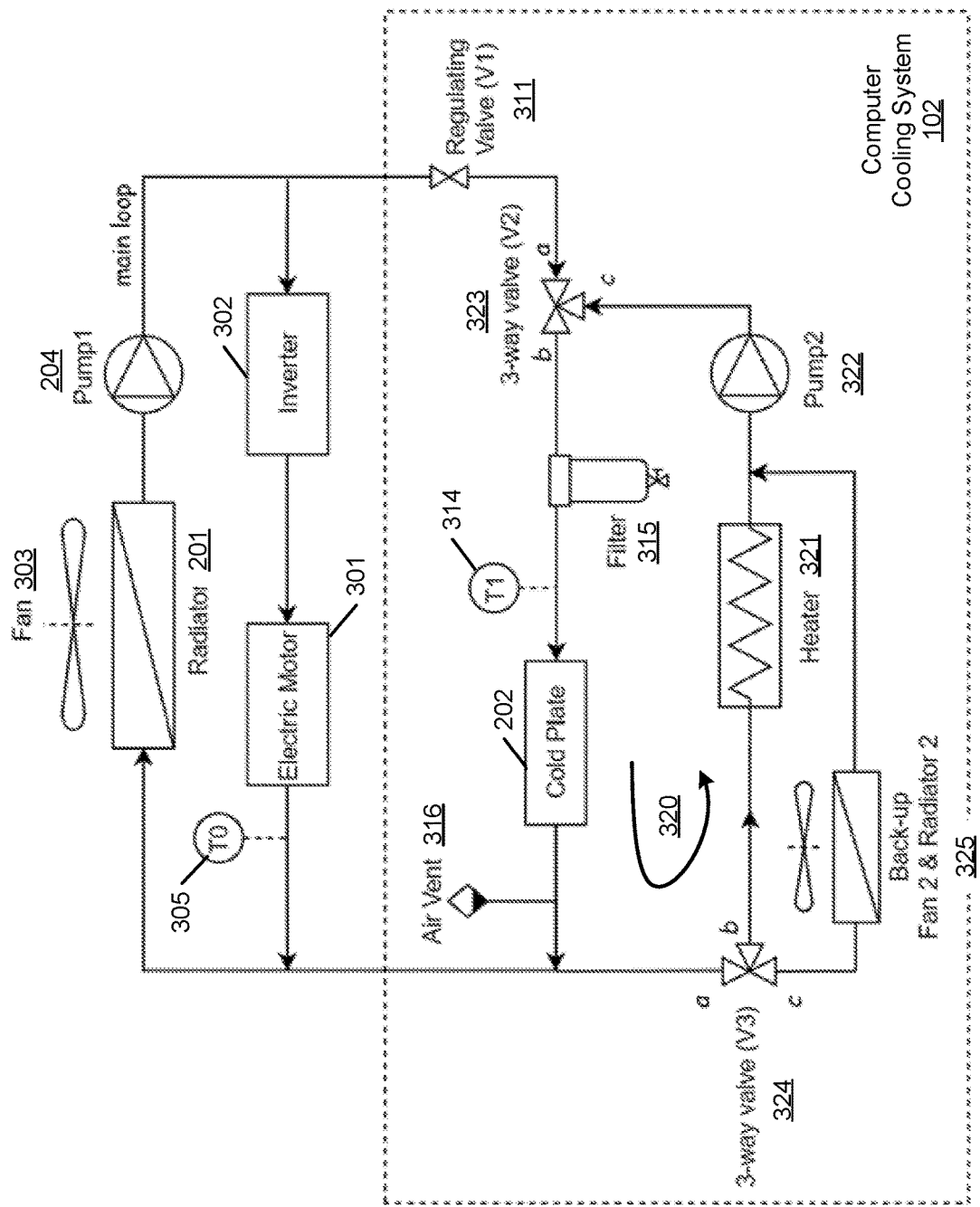
FIG. 3 is a block diagram illustrating an example of an autonomous driving vehicle according to another embodiment.

FIG. 3 is a schematic diagram illustrating an example of a cooling system according to one embodiment. Cooling system 300 may be utilized to provide cooling to an engine of a vehicle and an autonomous driving system that drives the vehicle. Referring to FIG. 3, cooling system 300 includes radiator 201 and liquid pump to pump and circulate cooling liquid to electric motor 301 and inverter 301 as a part of vehicle engine 103 via a first liquid distribution loop. The cooling liquid may be cooled by radiator 201 via air cooling by cooling fan 303.

In addition, cooling system 300 further includes a first valve 311, which when opened, will allow a portion of cooling liquid from an outlet port or output of radiator 201 via a liquid supply line 312 to a computer cooling system 310 represented by a dash block. The cooling liquid is then provided to an inlet port of cold plate 202. Note that although only one cold plate is shown, more cold plates may be configured to receive the cooling liquid from valve 311. The cooling liquid then travels through the liquid distribution channel of cold plate 202 to exchange the heat generated by a processor and radiate through cold plate 202. The cooling liquid carrying the exchanged heat is returned back to radiator 201 via liquid return line 313.

In one embodiment, valve 311 is a controllable valve that a flow rate of liquid through valve 311 can be controlled based on a control signal. In one embodiment, a temperature sensor 314 is disposed on a liquid supply path and near an inlet port of cold plate 202 to measure the temperature of the cooling liquid flowing into cold plate 202. Based on the liquid temperature, the opening of valve 311 can be controlled to control the liquid flow rate of the cooling liquid flowing into cold plate 202.

Since the cooling liquid received from radiator 201 is shared by the vehicle cooling system, the cooling liquid may contain some particles or dirt that may clock the liquid distribution channel of cold plate 202. In one embodiment, a filter 315 is disposed on the supply line or near the inlet port of cold plate 202 to block such potential particles or deposits from entering cold plate 202. In addition, due to temperature changing and liquid flow, some air bubbles may be generated. In one embodiment, an air venting port 316 may be disposed on the return path of cold plate 202 to allow the air bubbles to exit the cooling loop.

In one embodiment, system 300 further includes a heater 321 and a second liquid pump 322 coupled to cold plate 202 to form a liquid heating loop 320. In one embodiment, heater 321 is configured to warm the liquid flowing through cold plate 202. One of the purposes of the heating loop 320 is to warm the liquid flowing through cold plate, which in turns warm up the corresponding processor. Thus, system 300 can operate in a cooling mode (e.g., regular mode) or a heating mode.

One of the reasons that heater 321 is utilized herein is that an ADV may operate in a very low temperature environment, in which a processor of an autonomous driving system may not operate properly or operate inefficiently. As a result, during the initial operation of the autonomous driving system, heating loop 320 may be utilized to warm the liquid which in turn warms cold plate 202 and then warms the processor attached thereon. In one embodiment, another temperature sensor 305 is disposed near the outlet of motor 301 to measure the liquid temperature. In the cold environment, when the liquid temperature is below a first predetermined threshold, the heat mode is activated. When the operating temperature of the processor, which may be measured by temperature sensor 314, reaches a second predetermined threshold, the heating mode is deactivated and regular cooling mode is activated.

In one embodiment, a second valve 323 is disposed between cold plate 202 and an output of heater 321 and an output of radiator 201 to switch between a cooling loop represented by radiator 201 and a heating loop represented by heater 321. For example, valve 323 may be 3-way valve that can selectively open paths a-b, c-b, or both. When path a-b is turned on, system 300 operates in a cooling mode and when path c-b is turned on, the heating mode is activated. The liquid traveling through cold plate 202 is circulated back to heater 321.

According to one embodiment, a second radiator 325, operating as an air-to-liquid heat exchanger, is utilized as a backup secondary radiator to cool the cooling liquid. Backup radiator 325 is activated when the primary radiator 201 is unavailable, which is referred to herein as a backup cooling mode or simply a backup mode. When the backup mode is activated, the cooling liquid flows from the outlet port of cold plate 202 to an inlet port of radiator 325 for air cooling by a cooling fan. The outlet port of radiator 325 is coupled to the inlet port of cold plate 202 to circulate the cooling liquid that has been cooled back to cold plate 202, forming a backup cooling loop. In order to enable the heating loop or backup cooling loop, a third valve 324 is disposed between the outlet port of cold plate 202 and inlet ports of heater 321 and radiator 325. Thus, system 300 can operate in 1) a regular cooling mode, 2) a heating mode, or 3) a backup cooling mode.

In one embodiment, during the regular cooling mode, valve 323 is configured as a-b connection only and value 311 is open. Cold plate 202 allows the coolant flow to pick up the heat generated from the processor. The regulating valve 311 is a control valve of which the opening setting is adjustable according to the processor's temperature requirement sensed by temperature sensor 314. There is no flow through the valve 324 and the backup fan does not operate. The coolant is typically glycol/water mixture and its temperature can be high (e.g. 65° C.). The wetted material (part contacting the coolant) in cold plate is supposed to be compatible with the engine coolant, without corrosion, fouling and scaling issues in long-term operation. The heat transfer performance of cold plate should be sufficient in the working temperature range, especially at a high temperature, making sure that the processor will not be over-heated.

In one embodiment, during the heating mode, valve 323 is configured with a-b connection and c-b connection, and valve 324 is configured as a-b connection only. Valve 311 is fully open. When the vehicle starts in a very cold weather, the processor may not function properly. The heater is powered on. The coolant is pushed by Pump 2 and it is warmed up while going through the heater. It transfers the heat to the processor through the cold plate. The 3-way control valve 323 reads the temperatures T1 and T0. It adjusts the flow distribution between port a and port c, making sure that T1 is within the required range. When the coolant from the main loop is very cold (T0 is low), the flow is mostly from port c. As the main loop is warmed up, more and more flow is from port a. Eventually all the flow is from the main loop (a-b connection only) and it becomes the normal operation mode. In this mode, the back-up radiator 325 is by-passed and the backup fan does not operate. Pump 322 needs a much smaller pumping power and smaller space than pump 204, since it pumps the liquid in the heating loop only.

In one embodiment, during the backup cooling mode, valve 323 is configured as c-b connection only; valve 324 is configured with a-c connection only; valve 311 is fully closed. The fan 303 or the pump 204 in the main loop may stop operating due to the part failure. The backup fan and radiator 325 are supposed to operate instead. Typically, they are not designed to cool down the electric motor 301 and inverter 302, thus they do not need a large space on the vehicle. Pump 322 pumps the coolant in this smaller loop. In the case where cold weather and main loop failing occur at the same time, the system can just operate in the heating mode. Multiple processors can share a single large cold plate. The cold plate should be carefully designed for the height tolerances of the processor-contacting areas. Quick disconnects can be installed at the inlet port and outlet port of the cold plate for quick swap in maintenance.

FIG. 4 is a flow diagram illustrating an example of a process of providing liquid cooling to a computer system running within a vehicle according to one embodiment. Process 400 may be performed by processing logic which may include software, hardware, or a combination thereof. Referring to FIG. 4, at block 401, processing logic receives a portion of coolant from an outlet port of a radiator of a vehicle via a coolant supply line. The radiator is a part of vehicle cooling system that provides cooling to the vehicle engine of the vehicle. At block 402, processing logic distributes the coolant to one or more cold plates that may be mounted on one or more processors of the computer system running within the vehicle to exchange heat generated from the processors. At block 403, processing logic returns the coolant carrying the exchanged heat back to the radiator via a coolant return line.

Figure 5:
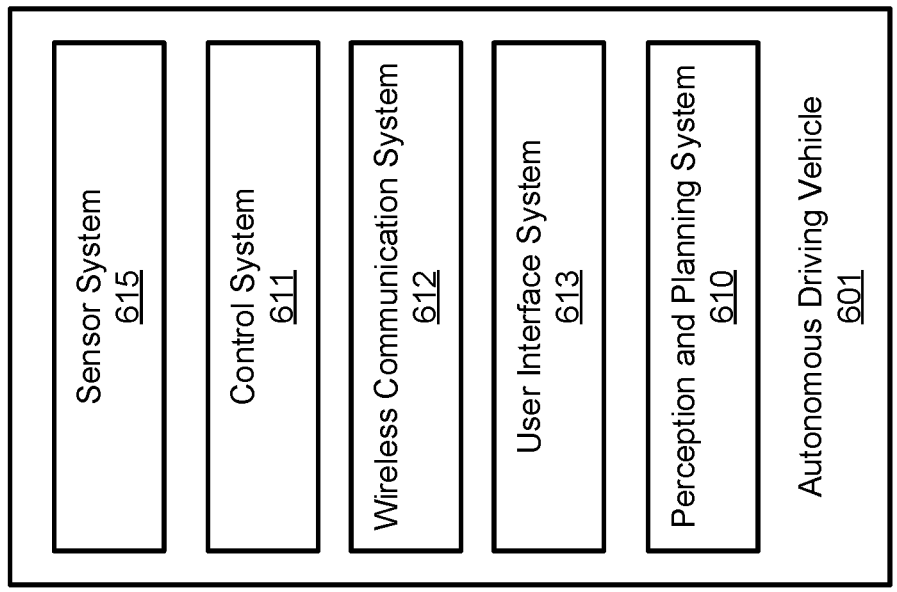
FIG. 5 is a block diagram illustrating an autonomous driving vehicle according to one embodiment.

FIG. 5 is a block diagram illustrating an autonomous driving vehicle according to one embodiment of the disclosure. Vehicle 600 can represent vehicle 100 as described above. Referring to FIG. 5, autonomous driving vehicle 601 may be communicatively coupled to one or more servers over a network, which may be any type of networks such as a local area network (LAN), a wide area network (WAN) such as the Internet, a cellular network, a satellite network, or a combination thereof, wired or wireless. The server(s) may be any kind of servers or a cluster of servers, such as Web or cloud servers, application servers, backend servers, or a combination thereof. A server may be a data analytics server, a content server, a traffic information server, a map and point of interest (MPOI) server, or a location server, etc.

An autonomous driving vehicle refers to a vehicle that can be configured to in an autonomous mode in which the vehicle navigates through an environment with little or no input from a driver. Such an autonomous driving vehicle can include a sensor system having one or more sensors that are configured to detect information about the environment in which the vehicle operates. The vehicle and its associated controller(s) use the detected information to navigate through the environment. Autonomous driving vehicle 601 can operate in a manual mode, a full autonomous mode, or a partial autonomous mode.

In one embodiment, autonomous driving vehicle 601 includes, but is not limited to, perception and planning system 610, vehicle control system 611, wireless communication system 612, user interface system 613, and sensor system 615. Autonomous driving vehicle 601 may further include certain common components included in ordinary vehicles, such as, an engine, wheels, steering wheel, transmission, etc., which may be controlled by vehicle control system 611 and/or perception and planning system 610 using a variety of communication signals and/or commands, such as, for example, acceleration signals or commands, deceleration signals or commands, steering signals or commands, braking signals or commands, etc.

Components 610-615 may be communicatively coupled to each other via an interconnect, a bus, a network, or a combination thereof. For example, components 610-615 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 6:
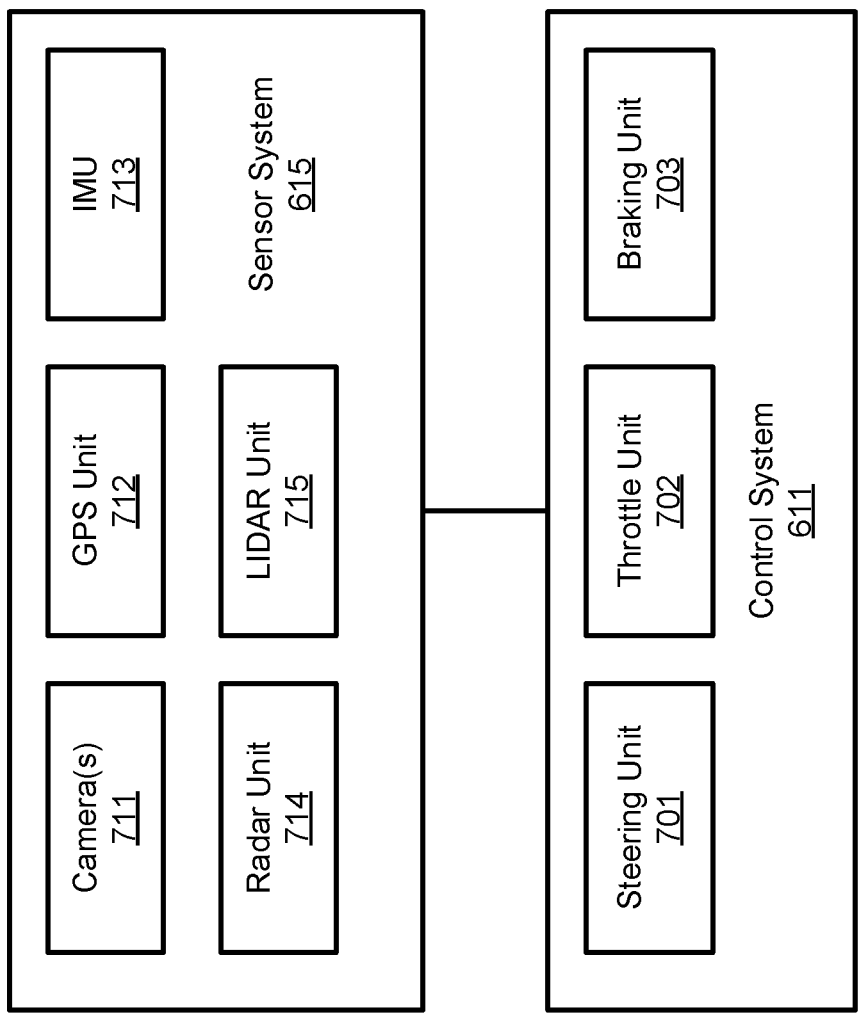
FIG. 6 is a block diagram illustrating an example of an autonomous driving vehicle according to one embodiment.

Referring now to FIG. 6, in one embodiment, sensor system 615 includes, but it is not limited to, one or more cameras 711, global positioning system (GPS) unit 712, inertial measurement unit (IMU) 713, radar unit 714, and a light detection and range (LIDAR) unit 715. GPS system 712 may include a transceiver operable to provide information regarding the position of the autonomous driving vehicle. IMU unit 713 may sense position and orientation changes of the autonomous driving vehicle based on inertial acceleration. Radar unit 714 may represent a system that utilizes radio signals to sense objects within the local environment of the autonomous driving vehicle. In some embodiments, in addition to sensing objects, radar unit 714 may additionally sense the speed and/or heading of the objects. LIDAR unit 715 may sense objects in the environment in which the autonomous driving vehicle is located using lasers. LIDAR unit 715 could include one or more laser sources, a laser scanner, and one or more detectors, among other system components. LIDAR unit 715 may include at least some of the LIDAR devices mounted with specific configurations as described above. Cameras 711 may include one or more devices to capture images of the environment surrounding the autonomous driving vehicle. Cameras 711 may be still cameras and/or video cameras. A camera may be mechanically movable, for example, by mounting the camera on a rotating and/or tilting a platform.

Sensor system 615 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous driving vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 611 includes, but is not limited to, steering unit 701, throttle unit 702 (also referred to as an acceleration unit), and braking unit 703. Steering unit 701 is to adjust the direction or heading of the vehicle. Throttle unit 702 is to control the speed of the motor or engine that in turn controls the speed and acceleration of the vehicle. Braking unit 703 is to decelerate the vehicle by providing friction to slow the wheels or tires of the vehicle. Note that the components as shown in FIG. 6 may be implemented in hardware, software, or a combination thereof.

Referring back to FIG. 5, wireless communication system 612 is to allow communication between autonomous driving vehicle 601 and external systems, such as devices, sensors, other vehicles, etc. For example, wireless communication system 612 can wirelessly communicate with one or more devices directly or via a communication network. Wireless communication system 612 can use any cellular communication network or a wireless local area network (WLAN), e.g., using WiFi to communicate with another component or system. Wireless communication system 612 could communicate directly with a device (e.g., a mobile device of a passenger, a display device, a speaker within vehicle 601), for example, using an infrared link, Bluetooth, etc. User interface system 613 may be part of peripheral devices implemented within vehicle 601 including, for example, a keyboard, a touch screen display device, a microphone, and a speaker, etc.

Some or all of the functions of autonomous driving vehicle 601 may be controlled or managed by perception and planning system 610, especially when operating in an autonomous driving mode. Perception and planning system 610 includes the necessary hardware (e.g., processor(s), memory, storage) and software (e.g., operating system, planning and routing programs) to receive information from sensor system 615, control system 611, wireless communication system 612, and/or user interface system 613, process the received information, plan a route or path from a starting point to a destination point, and then drive vehicle 601 based on the planning and control information. Alternatively, perception and planning system 610 may be integrated with vehicle control system 611.

For example, a user as a passenger may specify a starting location and a destination of a trip, for example, via a user interface. Perception and planning system 610 obtains the trip related data. For example, perception and planning system 610 may obtain location and route information from an MPOI server. The location server provides location services and the MPOI server provides map services and the POIs of certain locations. Alternatively, such location and MPOI information may be cached locally in a persistent storage device of perception and planning system 610.

While autonomous driving vehicle 601 is moving along the route, perception and planning system 610 may also obtain real-time traffic information from a traffic information system or server (TIS). Note that the servers may be operated by a third party entity. Alternatively, the functionalities of the servers may be integrated with perception and planning system 610. Based on the real-time traffic information, MPOI information, and location information, as well as real-time local environment data detected or sensed by sensor system 615 (e.g., obstacles, objects, nearby vehicles), perception and planning system 610 can plan an optimal route and drive vehicle 601, for example, via control system 611, according to the planned route to reach the specified destination safely and efficiently.

Figure 7:
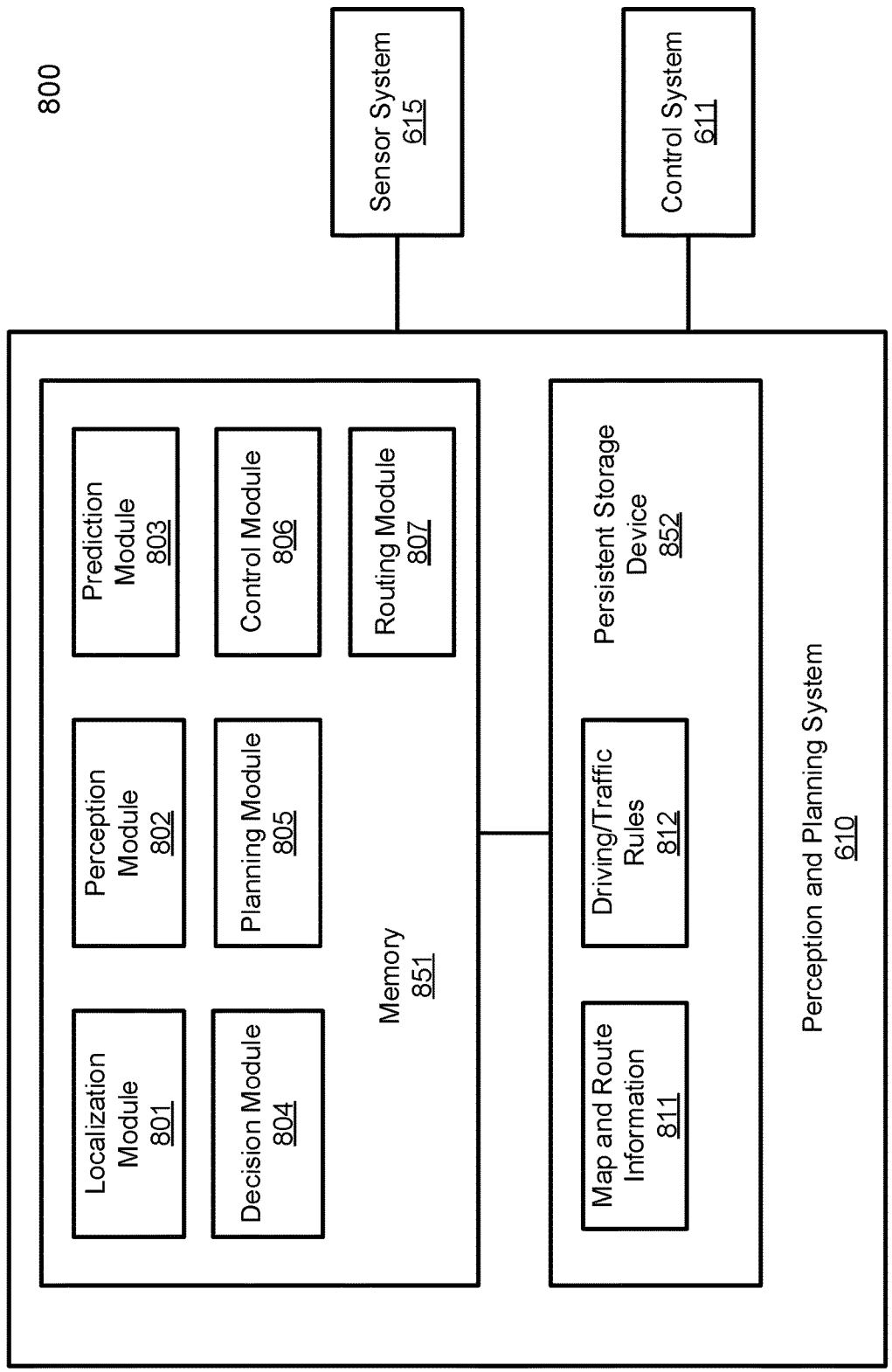
FIG. 7 is a block diagram illustrating an example of a perception and planning system used with an autonomous driving vehicle according to one embodiment.

FIG. 7 is a block diagram illustrating an example of a perception and planning system used with an autonomous driving vehicle according to one embodiment. System 800 may be implemented as a part of autonomous driving vehicle 601 of FIG. 5 including, but is not limited to, perception and planning system 610, control system 611, and sensor system 615. Referring to FIG. 7, perception and planning system 610 includes, but is not limited to, localization module 801, perception module 802, prediction module 803, decision module 804, planning module 805, control module 806, and routing module 807.

Some or all of modules 801-807 may be implemented in software, hardware, or a combination thereof. For example, these modules may be installed in persistent storage device 852, loaded into memory 851, and executed by one or more processors (not shown). Note that some or all of these modules may be communicatively coupled to or integrated with some or all modules of vehicle control system 611 of FIG. 6. Some of modules 801-807 may be integrated together as an integrated module.

Localization module 801 determines a current location of autonomous driving vehicle 300 (e.g., leveraging GPS unit 712) and manages any data related to a trip or route of a user. Localization module 801 (also referred to as a map and route module) manages any data related to a trip or route of a user. A user may log in and specify a starting location and a destination of a trip, for example, via a user interface. Localization module 801 communicates with other components of autonomous driving vehicle 300, such as map and route information 811, to obtain the trip related data. For example, localization module 801 may obtain location and route information from a location server and a map and POI (MPOI) server. A location server provides location services and an MPOI server provides map services and the POIs of certain locations, which may be cached as part of map and route information 811. While autonomous driving vehicle 300 is moving along the route, localization module 801 may also obtain real-time traffic information from a traffic information system or server.

Based on the sensor data provided by sensor system 615 and localization information obtained by localization module 801, a perception of the surrounding environment is determined by perception module 802. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 802 may include a computer vision system or functionalities of a computer vision system to process and analyze images captured by one or more cameras in order to identify objects and/or features in the environment of autonomous driving vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 802 can also detect objects based on other sensors data provided by other sensors such as a radar and/or LIDAR.

For each of the objects, prediction module 803 predicts what the object will behave under the circumstances. The prediction is performed based on the perception data perceiving the driving environment at the point in time in view of a set of map/rout information 811 and traffic rules 812. For example, if the object is a vehicle at an opposing direction and the current driving environment includes an intersection, prediction module 803 will predict whether the vehicle will likely move straight forward or make a turn. If the perception data indicates that the intersection has no traffic light, prediction module 803 may predict that the vehicle may have to fully stop prior to enter the intersection. If the perception data indicates that the vehicle is currently at a left-turn only lane or a right-turn only lane, prediction module 803 may predict that the vehicle will more likely make a left turn or right turn respectively.

For each of the objects, decision module 804 makes a decision regarding how to handle the object. For example, for a particular object (e.g., another vehicle in a crossing route) as well as its metadata describing the object (e.g., a speed, direction, turning angle), decision module 804 decides how to encounter the object (e.g., overtake, yield, stop, pass). Decision module 804 may make such decisions according to a set of rules such as traffic rules or driving rules 812, which may be stored in persistent storage device 852.

Routing module 807 is configured to provide one or more routes or paths from a starting point to a destination point.

For a given trip from a start location to a destination location, for example, received from a user, routing module 807 obtains route and map information 811 and determines all possible routes or paths from the starting location to reach the destination location. Routing module 807 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 804 and/or planning module 805. Decision module 804 and/or planning module 805 examine all of the possible routes to select and modify one of the most optimal routes in view of other data provided by other modules such as traffic conditions from localization module 801, driving environment perceived by perception module 802, and traffic condition predicted by prediction module 803. The actual path or route for controlling the ADV may be close to or different from the reference line provided by routing module 807 dependent upon the specific driving environment at the point in time.

Based on a decision for each of the objects perceived, planning module 805 plans a path or route for the autonomous driving vehicle, as well as driving parameters (e.g., distance, speed, and/or turning angle), using a reference line provided by routing module 807 as a basis. That is, for a given object, decision module 804 decides what to do with the object, while planning module 805 determines how to do it. For example, for a given object, decision module 804 may decide to pass the object, while planning module 805 may determine whether to pass on the left side or right side of the object. Planning and control data is generated by planning module 805 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 806 controls and drives the autonomous driving vehicle, by sending proper commands or signals to vehicle control system 611, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 805 plans a next route segment or path segment, for example, including a target position and the time required for the ADV to reach the target position. Alternatively, planning module 805 may further specify the specific speed, direction, and/or steering angle, etc. In one embodiment, planning module 805 plans a route segment or path segment for the next predetermined period of time such as 5 seconds. For each planning cycle, planning module 805 plans a target position for the current cycle (e.g., next 5 seconds) based on a target position planned in a previous cycle. Control module 806 then generates one or more control commands (e.g., throttle, brake, steering control commands) based on the planning and control data of the current cycle.

Note that decision module 804 and planning module 805 may be integrated as an integrated module. Decision module 804/planning module 805 may include a navigation system or functionalities of a navigation system to determine a driving path for the autonomous driving vehicle. For example, the navigation system may determine a series of speeds and directional headings to affect movement of the autonomous driving vehicle along a path that substantially avoids perceived obstacles while generally advancing the autonomous driving vehicle along a roadway-based path leading to an ultimate destination. The destination may be set according to user inputs via user interface system 613. The navigation system may update the driving path dynamically while the autonomous driving vehicle is in operation. The navigation system can incorporate data from a GPS system and one or more maps so as to determine the driving path for the autonomous driving vehicle.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. An autonomous driving system for autonomously driving an autonomous driving vehicle (ADV), the system comprising:
    one or more processors;
    a perception module executed by the processors to perceive a driving environment surrounding the ADV; and
    a planning module executed by the processors to plan a path based on perception data of the driving environment to navigate through the driving environment,
    wherein the processors are mounted on one or more cold plates coupled to a vehicle cooling system of the ADV, the vehicle cooling system having a first radiator and a first liquid distribution loop coupled to a vehicle engine of the ADV to provide liquid cooling to the vehicle engine, wherein a return-line temperature sensor is disposed on a return line of the first liquid distribution loop to sense a temperature of coolant of the first liquid distribution loop, wherein a heating loop is enabled when the temperature of the coolant of the first liquid distribution loop drops below a predetermined threshold, and
    wherein the cold plates are coupled to the first radiator via a second liquid distribution loop to receive a portion of the coolant from the first radiator to extract heat from the cold plates.

2. The system of claim 1, wherein the second liquid distribution loop comprises:
    a coolant supply line coupled to an outlet port of the first radiator to receive the coolant and to distribute the coolant to the cold plates; and
    a coolant return line coupled to an inlet port of the first radiator to return the coolant carrying the heat exchanged from the cold plates back to the first radiator.

3. The system of claim 2, further comprising a first control valve coupled between the coolant supply line of the second liquid distribution loop and the outlet port of the first radiator to control an amount of coolant flowing from the first radiator to the second liquid distribution loop.

4. The system of claim 3, further comprising a first temperature sensor disposed on the second liquid distribution loop to sense a liquid temperature of the coolant flowing within the second liquid distribution loop, and wherein the first control valve is configured to control a liquid flow rate of the coolant in the second liquid distribution loop based on the liquid temperature sensed by the first temperature sensor.

5. The system of claim 1, further comprising a heater coupled to the first liquid distribution loop or the second liquid distribution loop to form the heating loop, wherein the heating loop is configured to receive a portion of the coolant, to warm up the coolant, and to inject the warm coolant back to the second liquid distribution loop to warm up the cold plates.

6. The system of claim 5, further comprising a liquid pump disposed on the heating loop to circulate the coolant within the heating loop.

7. The system of claim 5, further comprising a coolant control valve configured to direct the coolant received from the first radiator and/or the heater to the cold plates, and wherein the coolant control valve is a 3-way control valve, which can at least partially couple the cold plates to an outlet port of the first radiator and/or the heater.

8. The system of claim 7, further comprising a second radiator coupled to the cold plates to form a backup cooling loop to provide liquid cooling to the cold plates when the first radiator is unavailable.

9. The system of claim 8, wherein an inlet port of the second radiator is coupled to outlet ports of the cold plates, wherein an outlet port of the second radiator is coupled to inlet ports of the cold plates.

10. The system of claim 9, further comprising an outlet control valve coupled to outlet ports of the cold plates and the inlet port of the second radiator to direct the coolant from the cold plates the second radiator.

11. The system of claim 10, wherein the outlet control valve is a 3-way valve, which can at least partially divert the coolant received from the cold plates to the heater or the second radiator.

12. A cooling system for providing liquid cooling to a computer system running within a vehicle, the system comprising:
    one or more cold plates to be mounted onto one or more processors of the computer system of the vehicle;
    a coolant supply line to be coupled to an outlet port of a first radiator of the vehicle to receive a portion of coolant from the first radiator and to distribute the coolant to the cold plates, wherein the first radiator provides liquid cooling to a vehicle engine of the vehicle, forming a first coolant distribution loop, wherein a return-line temperature sensor is disposed on a return line of the first coolant distribution loop to sense a temperature of the coolant of the first coolant distribution loop, wherein a heating loop is enabled when the temperature of the coolant of the first coolant distribution loop drops below a predetermined threshold; and
    a coolant return line to be coupled to an inlet port of the first radiator to return the coolant carrying heat exchanged from the cold plates back to the first radiator, forming a second coolant distribution loop.

13. The system of claim 12, wherein the computer system an autonomous driving system to autonomously drive the vehicle, including a perception module executed by the processors to perceive a driving environment surrounding the vehicle and a planning module executed by the processors to plan a path based on perception data of the driving environment to navigate through the driving environment.

14. The system of claim 13, further comprising a first control valve coupled between the coolant supply line of the second coolant distribution loop and the outlet port of the first radiator to control an amount of coolant flowing from the first radiator to the second coolant distribution loop.

15. The system of claim 14, further comprising a first temperature sensor disposed on the second coolant distribution loop to sense a liquid temperature of the coolant flowing within the second coolant distribution loop, and wherein the first control valve is configured to control a liquid flow rate of the coolant in the second coolant distribution loop based on the liquid temperature sensed by the first temperature sensor.

16. A method for providing liquid cooling to a computer system running within a vehicle, the method comprising:
receiving a portion of coolant from a first radiator of the vehicle via a coolant supply line from an outlet port of the first radiator of the vehicle, wherein the first radiator provides liquid cooling to a vehicle engine of the vehicle, forming a first coolant distribution loop, wherein a return-line temperature sensor is disposed on a return line of the first coolant distribution loop to sense a temperature of the coolant of the first coolant distribution loop, wherein a heating loop is enabled when the temperature of the coolant of the first coolant distribution loop drops below a predetermined threshold;
distributing the received coolant to one or more cold plates to be mounted onto one or more processors of the computer system of the vehicle; and
returning the coolant carrying heat exchanged from the cold plates back to an inlet port of the first radiator via a coolant return line, forming a second coolant distribution loop.

17. The method of claim 16, wherein the computer system an autonomous driving system to autonomously drive the vehicle, including a perception module executed by the processors to perceive a driving environment surrounding the vehicle and a planning module executed by the processors to plan a path based on perception data of the driving environment to navigate through the driving environment.

18. The method of claim 17, further comprising controlling an amount of coolant flowing from the first radiator to the second coolant distribution loop via a first control valve between the coolant supply line of the second coolant distribution loop and the outlet port of the first radiator.

19. The method of claim 18, further comprising sensing a liquid temperature of the coolant flowing within the second coolant distribution loop via a first temperature sensor disposed on the second coolant distribution loop, wherein the first control valve is configured to control a liquid flow rate of the coolant in the second coolant distribution loop based on the liquid temperature sensed by the first temperature sensor.

* * * * *